US009648544B1

(12) United States Patent
Arshad et al.

(10) Patent No.: US 9,648,544 B1
(45) Date of Patent: May 9, 2017

(54) COMMUNITY BASED NETWORK PROTOCOLS

(71) Applicant: International Business Machines Corporation, Armonk, NY (US)

(72) Inventors: Muneeb Arshad, Poughkeepsie, NY (US); Michael E. Gildein, II, Wappingers Falls, NY (US); Vijai Kalathur, Wappingers Falls, NY (US); Rajaram B. Krishnamurthy, Pleasant Valley, NY (US); Moses J. Vaughan, Mahwah, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/269,228

(22) Filed: Sep. 19, 2016

(51) Int. Cl.
*H04L 12/28* (2006.01)
*H04W 40/22* (2009.01)
(Continued)

(52) U.S. Cl.
CPC ............ *H04W 40/22* (2013.01); *H04L 45/74* (2013.01); *H04W 8/005* (2013.01); *H04W 40/04* (2013.01); *H04W 76/023* (2013.01); *H04W 80/04* (2013.01)

(58) Field of Classification Search
USPC ................. 370/252, 329, 389, 386
See application file for complete search history.

(56) References Cited

U.S. PATENT DOCUMENTS 8,023,957 B2 9/2011 Weigand
2008/0040481 A1 2/2008 Joshi et al.
(Continued)

FOREIGN PATENT DOCUMENTS

CN 104661275 A 5/2015
DE 102012221882 A1 6/2014
JP 5826288 B2 12/2015

OTHER PUBLICATIONS

Deepalakshmi et al., "An ant colony-based, receiver-initiated multicast mesh protocol for collaborative applications of mobile ad hoc networks", Transactions on Emerging Telecommunications Technologies, Trans. Emerging Tel. Tech. 2014; 25:354-369, Published online Sep. 29, 2012 in Wiley Online Library (wileyonlinelibrary.com), DOI: 10.1002/ett.2574, pp. 354-369, Copyright © 2012 John Wiley & Sons, Ltd.

*Primary Examiner* — John Pezzlo
(74) *Attorney, Agent, or Firm* — Lance I. Hochhauser

(57) ABSTRACT

A computer-implemented method includes determining that network connectivity does not exist for a mobile data network. The computer-implemented method further includes initiating, via a wireless peer to peer communication protocol, a scan request to identify one or more peer devices, wherein each of one or more peer devices have a readiness score. The computer-implemented method further includes generating a routing table. The routing table includes the one or more peer devices located within a threshold distance. The computer-implemented method further includes generating a forwarding table. The forwarding table includes the one or more peer devices of the routing table that have a readiness score that exceeds a given threshold. The computer-implemented method further includes transmitting a data packet to each of the one or more peer devices of the forwarding table. A corresponding computer program product and computer system are also disclosed.

20 Claims, 4 Drawing Sheets

(51) Int. Cl.
*H04W 8/00* (2009.01)
*H04W 40/04* (2009.01)
*H04W 76/02* (2009.01)
*H04L 12/741* (2013.01)
*H04J 1/16* (2006.01)
*H04W 80/04* (2009.01)

(56) References Cited

U.S. PATENT DOCUMENTS

| | | |
|---|---|---|
| 2014/0362847 A1 | 12/2014 | Turunen et al. |
| 2015/0223114 A1 | 8/2015 | Tian et al. |
| 2015/0264627 A1* | 9/2015 | Perdomo ............... H04W 40/12 370/329 |

* cited by examiner

COMMUNITY BASED NETWORK PROTOCOLS

BACKGROUND

The present invention relates generally to wireless mesh networks and in particular to community based protocols for a wireless mesh network.

A mesh network is a network topology in which each node relays data for the network. Thus, all mesh nodes cooperate in the distribution of data in the network. Although mostly used in wireless situations, the concept of a mesh network may also be applied to wired networks and interactions between software. Generally, mesh networks may relay messages through either a "routing" process or a "flooding" process. Typically, there exists more than one path between the source and destination of the message. In a "routing" process, a message is propagated along a pathway by "hopping" sequentially from one node to another until the message reaches its final destination. If a connection path is broken, the message may be rerouted along a different pathway. In a "flooding" process, instead of using a specific pathway for transmitting a message, the message is instead propagated to every node within the network, even those nodes whom the message was not intended.

SUMMARY

A computer-implemented method includes determining that network connectivity does not exist for a mobile data network. The computer-implemented method further includes initiating, via a wireless peer to peer communication protocol, a scan request to identify one or more peer devices, wherein each of one or more peer devices have a readiness score. The computer-implemented method further includes generating a routing table. The routing table includes the one or more peer devices located within a threshold distance. The computer-implemented method further includes generating a forwarding table. The forwarding table includes the one or more peer devices of the routing table that have a readiness score that exceeds a given threshold. The computer-implemented method further includes transmitting a data packet to each of the one or more peer devices of the forwarding table. A corresponding computer program product and computer system are also disclosed.

DETAILED DESCRIPTION

Figure 1:
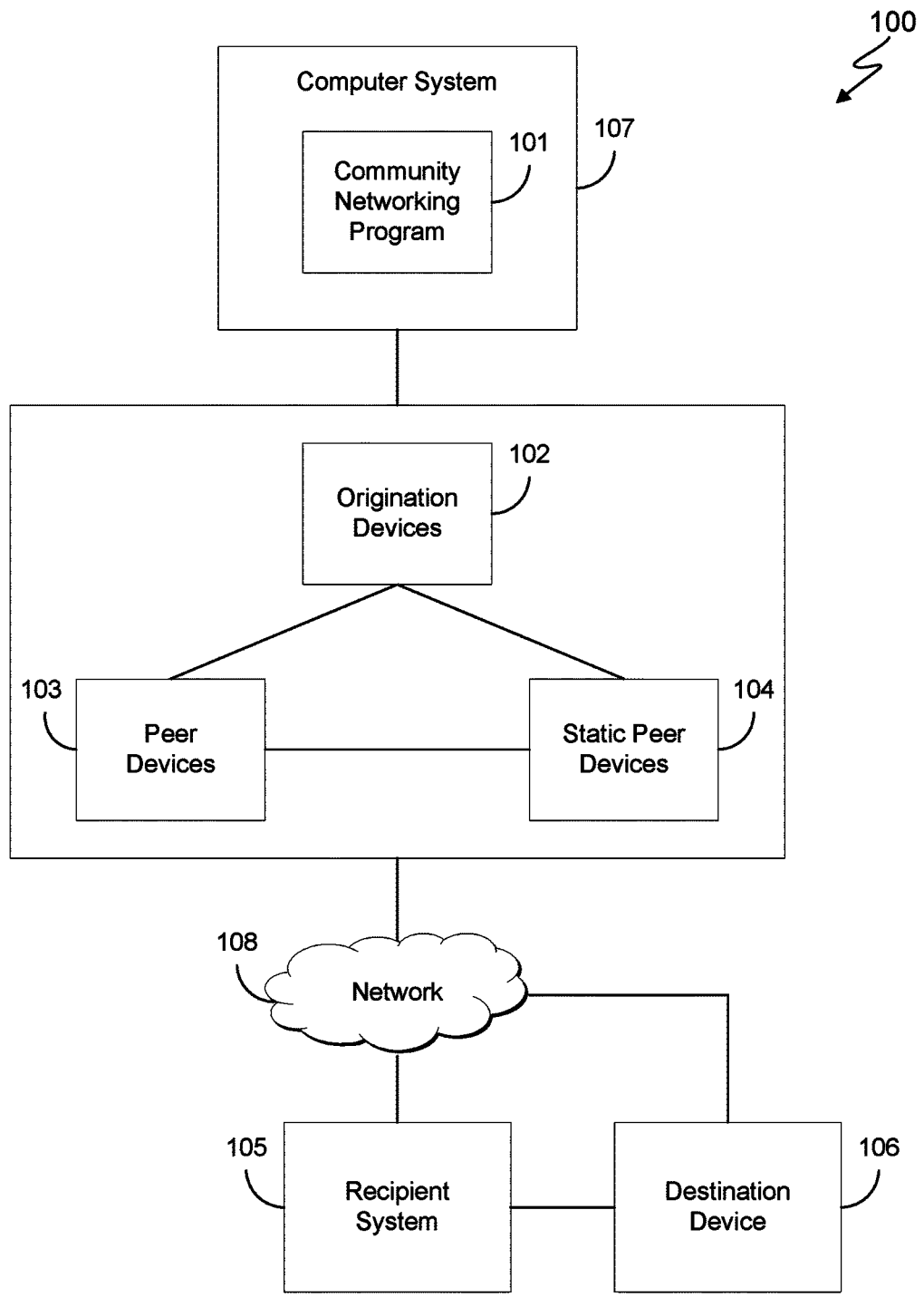
FIG. 1 is a functional block diagram of a distributed data processing environment, generally designated 100, suitable for operation of a community networking program, in accordance with at least one embodiment of the invention.

Generally, wireless mesh networks consist of mesh clients (e.g., laptops, mobile phones, and other various mobile devices), mesh routers and gateways, wherein the mesh routers forward messages to and from the gateways which may, but need not, be connected to the Internet. Wireless mesh networks may be implemented with various technologies (e.g., 802.11, 802.15, 802.16, and cellular technologies) and need not be restricted to any single technology or protocol. A wireless ad hoc network is a self-configuring, dynamic network in which nodes are free to move and join the network "on the fly." Unlike traditional wireless mesh networks, in a wireless ad hoc network, the network does not rely on any pre-existing infrastructure (e.g., routers in wired networks or access points in managed wireless networks). Instead, each node (i.e., a device connected to a network that is capable of creating, receiving, or transmitting information over a communications channel) participates in routing by forwarding data from one node to another until a final destination is reached. The determination of the connection (i.e., "edge") made between two nodes, as well as the pathway (i.e., string of "edges" connecting an initial node and a destination node) is dynamically based on the network connectivity of each node at the time the data is to be transmitted.

Embodiments of the present invention recognize that when utilizing a wireless ad hoc network, some devices in the network may be better suited than others to receive and/or transmit data when no internet connection is available. Embodiments of the present invention recognize that it is desirable to pool together network resources of a community of devices (i.e., a group of devices that use a common application ("app") or a group of devices that use a common purchased app, wherein the app may include a one-time and/or monthly fee, a maintenance fee, a use fee, etc.) to receive and/or transmit data in an optimal way. Embodiments of the present invention recognize that it would be desirable to pool together network resources of a community of devices that is beneficial to all of the devices that belong to the community. Embodiments of the present invention recognize that it would be desirable for each member device of the community to intermittently calculate a readiness score to identify the likelihood and readiness of each device to act as a receiver and/or transmitter of the data.

Embodiments of the present invention recognize that in a wireless ad hoc network, the pathway is dynamically based on the network connectivity of each device at the time the data is to be transmitted. However, there may be situations where no nearby device is connected to the network and thus no nearby device able to forward the data. Embodiments of the present invention recognize that it is desirable to allow devices that have no connectivity at a given point and/or time to be able to communicate with other devices even when no nearby device is connected to the network. Embodiments of the present invention recognize that in a wireless ad hoc network, there may be a situation where both no network connectivity exists and no nearby device is present. In this scenario, a device with no network connectivity is unable to communicate with other devices, because no device is available to forward the data. Embodiments of the present invention recognize that it would be desirable to allow devices to send data via a static message drop off location communicatively connected to a community network when no device is present to forward the data. Various embodiments of the present invention may address or improve upon some or all of the aforementioned problems or disadvantages, however it will be understood that addressing any particular problem or disadvantage is not a necessary requirement for the practice of all embodiments of the present invention.

Referring now to various embodiments of the invention in more detail, FIG. 1 is a functional block diagram of a distributed data processing environment, generally designated 100, suitable for operation of a community networking program in accordance with at least one embodiment of the invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes origination device 102, one or more peer devices 103, one or more static peer devices 104, recipient system 105, destination device 106, and computer system 107, interconnected over network 108. Network 108 can be, for example, a telecommunications network, a local area network (LAN), a wide area network (WAN), such as the Internet, a personal area network (PAN) or a combination of the four, and can include wired, wireless, or fiber optic connections. Network 108 may include one or more wired and/or wireless networks that are capable of receiving and transmitting data, voice, and/or video signals, including multimedia signals that include voice, data, and video information. In embodiments of the invention, network 108 may be a mobile data network. In general, network 108 may be any combination of connections and protocols that will support communications between origination device 102, peer devices 103, static peer devices 104, recipient system 105, destination device 106, computer system 107, and other computing devices (not shown) within distributed data processing environment 100. More specifically, network 108 may include wireless peer-to-peer communication protocols including, but not limited to Bluetooth®, Bluetooth® Low Energy ("BLE"), infrared, Near-Field Communication ("NFC"), Radio Frequency Identification ("RFID"), etc.

Origination device 102, one or more peer devices 103, and destination device 106 may be a laptop computer, tablet computer, smartphone, smartwatch, or any programmable electronic device capable of communicating with various components and devices within distributed data processing environment 100, via network 108. In general, origination device 102, one or more peer devices 103, one or more static peer devices 104, and destination device 106 represent any programmable electronic device or combination of programmable electronic devices capable of executing machine readable program instructions and communicating with other computing devices (not shown) within distributed data processing environment 100 via a network, such as network 108. Origination device 102, one or more peer devices 103, and destination device 106 may include user interface 109.

User interface 109 provides an interface between origination device 102 and recipient system 105, between each peer device 103 and computer system 107, and between destination device 106 and computer system 107. In one embodiment, user interface 109 may be a graphical user interface (GUI) or a web user interface (WUI) and can display text, documents, web browser windows, user options, application interfaces, and instructions for operation, and include the information (e.g., graphics, text, and sound) that a program presents to a user and the control sequences the user employs to control the program. In another embodiment, user interface 109 may also be mobile application software that provides an interface between a user of origination device 102 and computer system 107, between a user of each peer device 103 and computer system 107, and between a user of destination device 106 and computer system 107. Mobile application software, or an "app," is a computer program that runs on smartphones, tablet computers, smartwatches, and any other mobile devices. User interface 109 enables a user to provide login credentials to access an "app" on origination device 102, each peer device 103, and destination device 106.

A static peer device 104 may be any digital storage device medium that has the ability to receive data packets from an origination device 102 and/or one or more peer devices 103, temporarily store the data packets, and transmit the data packets to one or more peer devices 103. More specifically, a static peer device 104 may be a digital message bin, whereby users of an origination device 102 and one or more peer devices 103 may pick up and drop off messages via a wireless peer-to-peer network protocol to be transmitted to a final destination device 106 via a mobile data network. It should be appreciated that a static peer device 104 allows an origination device 102 and one or more peer devices 103 to transmit messages to a destination device 106 when no network connectivity exists for a mobile data network and/or one or more peer devices 103 are not currently present to forward a message to one or more subsequent peer devices 103 via a wireless peer-to-peer network protocol.

Computer system 107 can be a standalone computing device, a management server, a web server, a mobile computing device, or any other electronic device or computing system capable of receiving, sending, and processing data. In other embodiments, computer system 107 can represent a server computing system utilizing multiple computers as a server system, such as in a cloud computing environment. In an embodiment, computer system 107 represents a computing system utilizing clustered computers and components (e.g., database server computers, application server computers, etc.) that act as a single pool of seamless resources when accessed within distributed data processing environment 100. Computer system 107 includes community networking program 101 communicatively coupled to computer system 107. In embodiments of the invention, community networking program 101 is implemented as an app running on origination device 102, a peer device 103, a static peer device 104, and destination device 106. Computer system 107 may include internal and external hardware components, as depicted and described in further detail with respect to FIG. 4.

Figure 2:
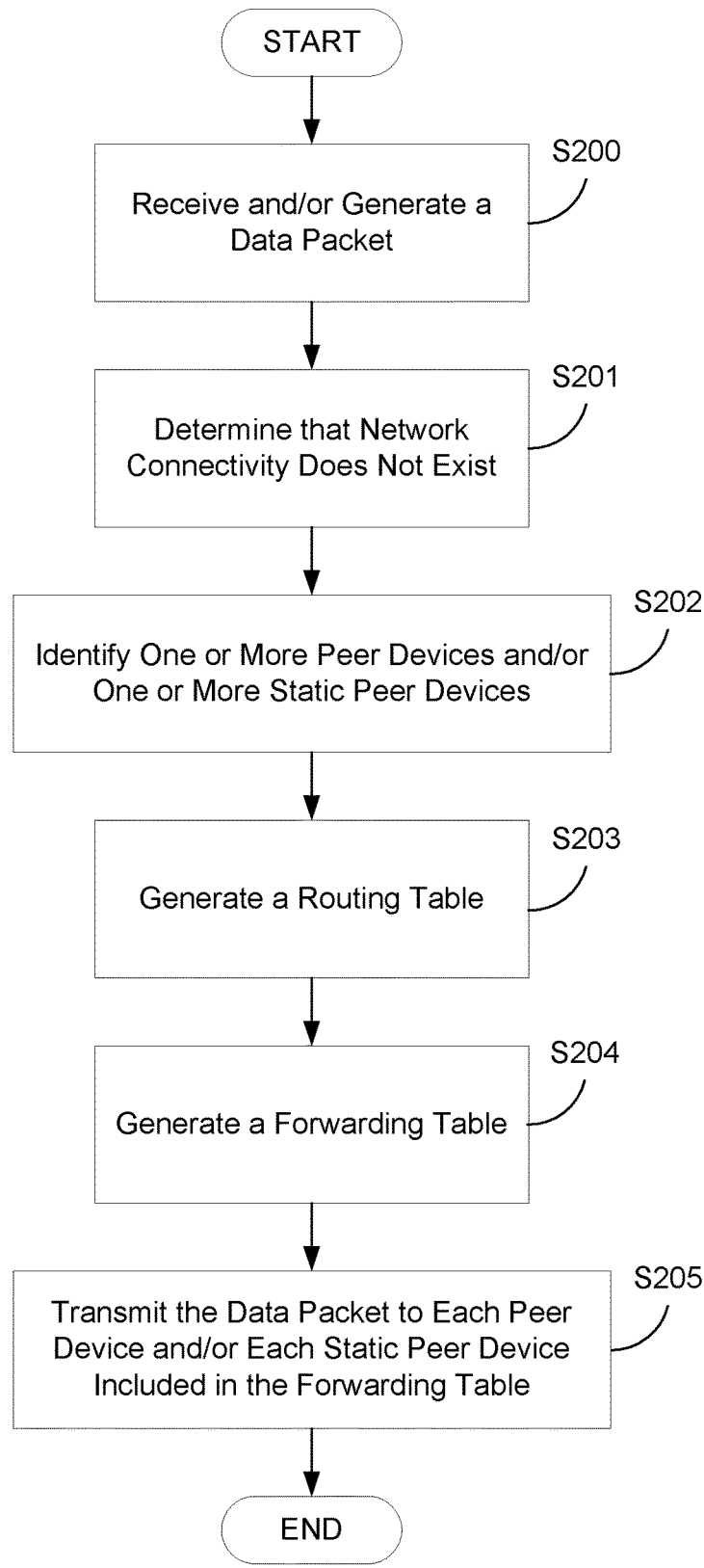
FIG. 2 is a flow chart diagram depicting operational steps for a community networking program, in accordance with at least one embodiment of the invention.

FIG. 2 is a flow chart diagram depicting operational steps for a community networking program 101 in accordance with an embodiment of the present invention. In embodiments of the invention, community networking program may be located on one or more origination devices 102, one or more peer devices 103, and/or one or more static peer devices 104. A static peer device 104 may generally be understood as a digital message bin for temporarily storing data packets when one or more peer devices 103 are not present to forward a data packet. It should be appreciated that by providing a digital message bin in geographic areas where network coverage is known not to exist, devices with no network connectivity may drop off message to later be picked up and forwarded by one or more peer devices 103 moving in the direction of network connectivity.

At step S200, community networking program 101 receives a data packet from one or more peer devices 103 and/or one or more static peer devices 104 to be transmitted to a destination device 106. In an alternative embodiment of the invention, at step S200, community networking program 101 generates a data packet to be transmitted to a destination device 106. Generally, a data packet is a formatted unit of data made up of a list of bits or bytes. In an embodiment of the invention, the data packet includes an origination device network address, a destination device network address, data content, a unique hash value, a "time to live" ("TTL") value, and a hop limit. Here, a unique hash value is created for each message generated by community networking program 101 within a community based network. The hop limit may generally be understood as a limit on the number of "hops" (i.e., the passing of data packet from one device to another) a data packet is allowed before being discarded. A TTL value may generally be understood as the amount of time a data packet may remain on a device before being discarded. If a data packet is unable to be transmitted to a destination device 106 within a given amount of time, the data packet is discarded. Alternatively, if a data packet is able to be transmitted to a destination device 106 within a given amount of time, then the destination device 106 will reassemble the data packet into its original message.

At step S201, community network program 101 determines that network connectivity does not exist for a mobile data network (i.e., cellular network or mobile network). In an embodiment of the invention, network 108 may be a mobile data network. A mobile data network may generally be understood as a communication network where the last link is wireless. In a mobile data network, the network is distributed over land areas (i.e., cells), each served by at least one fixed-location transceiver (i.e., cell site or base station). When joined together, the cells provide radio coverage over a wide geographic area, thus enabling mobile devices to communicate with each other and with fixed transceivers, via the base stations. However, many areas exist where mobile devices are unable to transmit messages via a mobile network. Areas where mobile devices cannot transmit messages are known as "dead zones." Dead zones are usually areas where network service is unavailable because the signal between the handset and mobile site antennas is blocked or severely reduced. A number of factors can result in a dead zone, such as limitations in cellular network architecture (locations of antennas), limited network density, topography, weather, as well as the blocking of a direct signal path in areas where signal reception would normally be strong (e.g., underground areas such as tunnels and subway stations).

At step S202, community networking program 101 initiates, via a wireless peer-to-peer communication protocol, a scan request to identify one or more peer devices 103 and/or one or more static peer devices 104. More specifically, community networking program 101 identifies a readiness that is broadcasted at a regular time interval from one or more peer devices 103. In an embodiment of the invention, community networking program 101 identifies a readiness score via a Bluetooth® beacon signal being broadcast by one or more peer devices 103 and/or one or more static peer devices 104. A beacon signal may be understood as a form of communication that includes small packets of data which are broadcast at a regular interval by via radio waves. In an embodiment of the invention, community networking program 101 identifies a readiness score via a BLE beacon signal being broadcast by one or more peer devices 103 and/or on or more static peer devices 104. In an embodiment of the invention, community networking program 101 identifies a readiness score via an active RFID signal being broadcast from one or more peer devices 103 and/or one or more static peer devices 104. In an embodiment of the invention, community networking program 101 identifies a readiness score via a signal being broadcast by one or more peer devices 103 and/or one or more static peer devices 104 via NFC.

A readiness score may generally be understood as an identifier as to a likelihood and/or readiness of an origination device 102, a peer device 103 and/or a static peer device 104 to act as a transmitter of a data packet. In an embodiment of the invention, a readiness score is calculated by community networking program 101 installed as an app for a community messaging network on each origination device 102 (not shown), each peer device 103 (not shown), and/or each static peer device 104 (not shown).

At step S203, responsive to identifying one or more peer devices 103 and/or one or more static peer devices 104, community networking program generates a routing table. A routing table may generally be understood as a data file in RAM that is used to store route information about directly connected and/or remote networks. Here, the routing table may include one or more peer devices 103 and/or one or more static peer devices 104 located within a threshold distance (e.g., 10 feet, 50 feet, 200 feet, etc.) of community networking program 101. In an embodiment, community networking program 101 may add one or more peer devices 103 and/or one or more static peer devices 104 to the routing table via a dynamic routing protocol.

At step S204, community networking program 101 generates a forwarding table. A forwarding table may generally be understood as a sub selection of the preferred routes for packet forwarding selected from the routing table. In an embodiment of invention, the forwarding table includes one or more peer devices 103 that have a readiness score that exceeds a given threshold. In an embodiment of the invention, the forwarding table includes one or more static peer devices 104. In embodiments of the invention, community networking program 101 calculates a readiness score based on at least one of the following factors: an analytics score, device resources, available device data, a community participation score, and network connectivity.

Community networking program 101 may generate an analytics score to determine a probability of each peer device 103 obtaining network connectivity based on calendar entries, emails, text messages, maps, etc. For example, calendar entries (e.g., meetings, appointments, and addresses) found on a peer device 103 may give valuable insight as to the current or near future location of a user of a peer device 103. In another example, a peer device 103 may contain text messages regarding information identifying the current or near future location of a user of a peer device 103. In another example, a peer device 103 may have an email containing information regarding a future location of a user of a peer device 103. In another example, a user of a peer device 103 may be actively using a geo-routing application (e.g., Google Maps or MapQuest), from which the current location and destination location of the peer device may be obtained. Based on determining the current or near future position of a peer device 103, the probability of a peer device 103 obtaining a network connection may be established by comparing the current or likely near future location of the peer device 103 with a map of known cell towers and/or wireless routers. Accordingly, a peer device 103 having a high probability of network connectivity will contribute to a higher readiness score, whereas a peer device 103 having a low probability of network connectivity will contribute to a lower readiness score.

Community networking program 101 may analyze device resources to determine the probability of each peer device 103 having the operational capacity to forward a message. Device resources may include, but are not limited to available memory, the type of central processing unit (CPU), remaining battery life, uptime (i.e., the length of time a device has been turned on), network utilization (i.e., the ratio of current network traffic to the maximum traffic a port can handle), etc. Accordingly, a peer device 103 having a high operational capacity (e.g., available memory for storing the data message, a high percentage of remaining battery life, a short uptime, etc.) will contribute to a higher readiness score, whereas a peer device 103 having a low operational capacity (e.g., little to no available memory for storing the data message, a low percentage of remaining battery life, a long uptime, etc.) will contribute to a lower readiness score.

Community networking program 101 may analyze the amount of data available according to a data plan for each peer device 103. A peer device 103 having an unlimited data plan or a large data plan and having a large amount of available data will contribute to a higher readiness score, whereas a peer device 103 having a small data plan, little available data, or a data overage will contribute to a lower readiness score.

Community networking program 101 may generate a community participation score based on the ratio of the number of instances a user of each peer device 103 has utilized the community based network to send self-generated messages versus the number of instances the user of each peer device 103 has propagated messages generated by other peer devices 103. Accordingly, a peer device 103 having a lower ratio of self-generated messages sent versus propagated messages derived by other peer devices 103 will contribute to a higher readiness score, whereas a peer device 103 having a higher ratio of self-generated messages sent versus propagating messages derived by other peer devices 103 will contribute to a lower readiness score.

In some embodiments, community networking program 101 determines that one or more peer devices 103 have network connectivity (e.g., via a mobile data network or Wi-Fi). Accordingly, a peer device 103 having network connectivity will contribute to a substantially higher readiness score. However, a readiness score of a peer device 103 having network connectivity may be decreased based on other negative factors, such as low device resources, a low amount of available data, and a low participation score.

Additionally, each factor may be weighted according to a relative importance of the given factor. In some embodiments, a general purpose analytics engine (e.g., community networking program 101) calculates a readiness score. In other embodiments, calculation of a readiness score may be performed by an analytics engine that operates on a model tailored to analyzing factors associated with a readiness score, such as IBM® Watson®. It should be appreciated that the calculation of a readiness score for each peer device 103 allows mobile devices that have no connectivity at a given point in time and/or area to continue to be able to communicate with other mobile devices in an optimized manner that is beneficial to all members participating in the community based network. In an embodiment of the invention, members of the community based network have the option to pay a community fee to improve their community participation score.

For example, community networking program may identify six peer devices (103A, 103B, 103C, 103D, 103E, and 103F) and one static peer device 104A located within a threshold distance of 100 feet of community networking program 101. Furthermore, each of the six peer devices may be broadcasting a readiness score at a regular time interval. The readiness score is calculated at a regular time interval by community networking program 101 installed as an app on each peer device 103. Accordingly, the readiness score may change as information used to calculate the readiness score changes. Here, community networking program 101 calculates the readiness score based on each factor having an assigned weight (e.g., analytics score (75%), device resources (5%), amount of data available (5%), and community participation score (15%)). The weights assigned to each factor are not fixed and may be modified. In an embodiment, the readiness score is be a numerical number (e.g., one through ten). In an embodiment, the readiness score is a range (e.g., low, medium, or high). The readiness score may be represented by any generally known means of ranking the one or more peer devices 103 among each other. In the current example, peer device 103A has a readiness score of five, peer device 103B has a readiness score of three, peer device 103C has a readiness score of nine, peer device 103D has a readiness score of seven, peer device 103E has a readiness score of two, and peer device 103F has a readiness score of eight. Based on the six peer devices and one static peer device identified, community networking program 101 may generate a routing table including peer devices 103A through 103F and static peer device 104A. From the routing table, community networking program 101 may further generate a forwarding table based on the peer devices from the routing table that have a readiness score greater than five. Accordingly, community networking program 101 will generate a forwarding table including peer device 103C (readiness score of nine), peer device 103D (readiness score of seven), and peer device 103F (readiness score of nine). In some embodiments, community networking program 101 always includes a static peer device 104 in the routing table. In some embodiments, community networking program 101 includes a static peer device 104 in the routing table if no peer devices 103 are identified. In some embodiments, community networking program 101 includes a static peer device 104 if some and/or all of the one or more peer devices 103 identified have a low readiness score.

At step S205, community networking program 101 transmits the data packet to each peer device 103 and/or each static peer device 104 included in the forwarding table. Community networking program 101 may transmit the data packet by any generally known wireless technologies, including, but not limited to Bluetooth®, BLE, NFC, and active RFID. In some embodiments, community networking program 101 returns to step S200 for each of the one or more peer devices 103 and/or each of the one or more static peer devices 104 included in the forwarding table that received the data packet. In some embodiments, steps S200-S205 may continue to be repeated until any of the following events occur: (i) network connectivity exists and a peer device 103 sends the data packet to a recipient system 105; (ii) the hop limit of the data packet is reached; or (iii) the TTL value of the data packet has expired.

Figure 3:
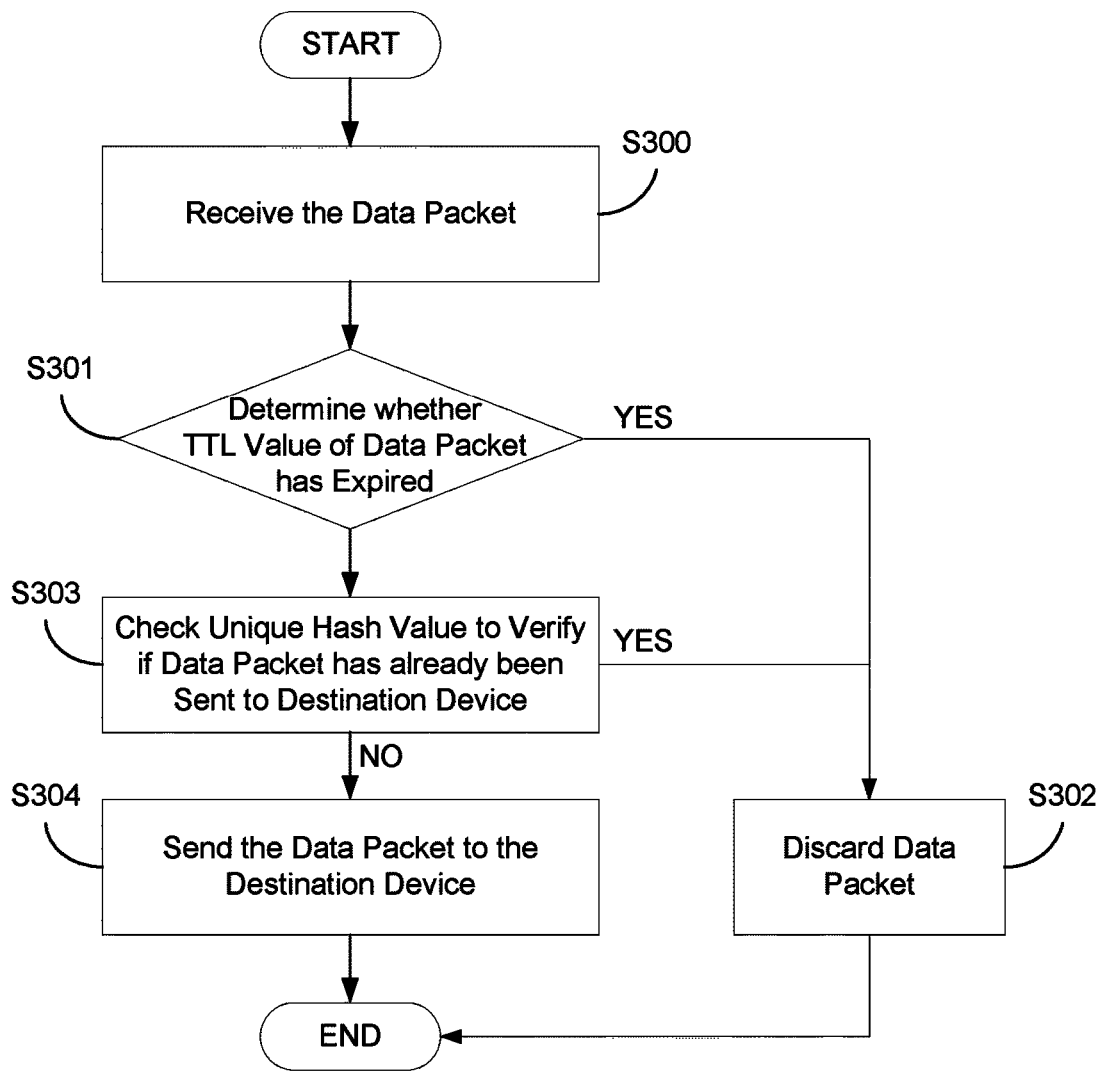
FIG. 3 is a flow chart diagram depicting operational steps for a recipient system, in accordance with at least one embodiment of the invention.

FIG. 3 is a flow chart diagram depicting operational steps for a recipient system in accordance with at least one embodiment of the invention. In some embodiments, community networking program 101 forwards the data packet to a destination device 106 via a peer-to-peer wireless communication protocol. In some embodiments, community networking program 101 transmits the data packet to a recipient system 105. At step S300, recipient system 105 receives the data packet from an origination devices 102 and/or one or more peer devices 103 via a mobile data (e.g., network 108). In an embodiment of the invention, recipient system 105 is a central server that receives all of the messages transmitted by an origination device 102 and/or one or more peer devices 103 of the community based network prior to the messages being sent to a destination device 106. At step S301, recipient system 105 determines whether the TTL value of the data packet has expired. Following the "YES" branch from step S301, at step S302, recipient system 105 discards the data packet. Alternatively, following the "NO" branch from step S301, at step S303, recipient system 105 checks the unique hash value of the data packet to verify whether the data packet has already been sent to a destination device 106. Following the "YES" branch from step S303, the process returns back to step S302 and recipient system 105 discards the data packet. Alternatively, following the "NO" branch from step S303, at step S204, recipient system 105 sends the data packet to a destination device 106.

Figure 4:
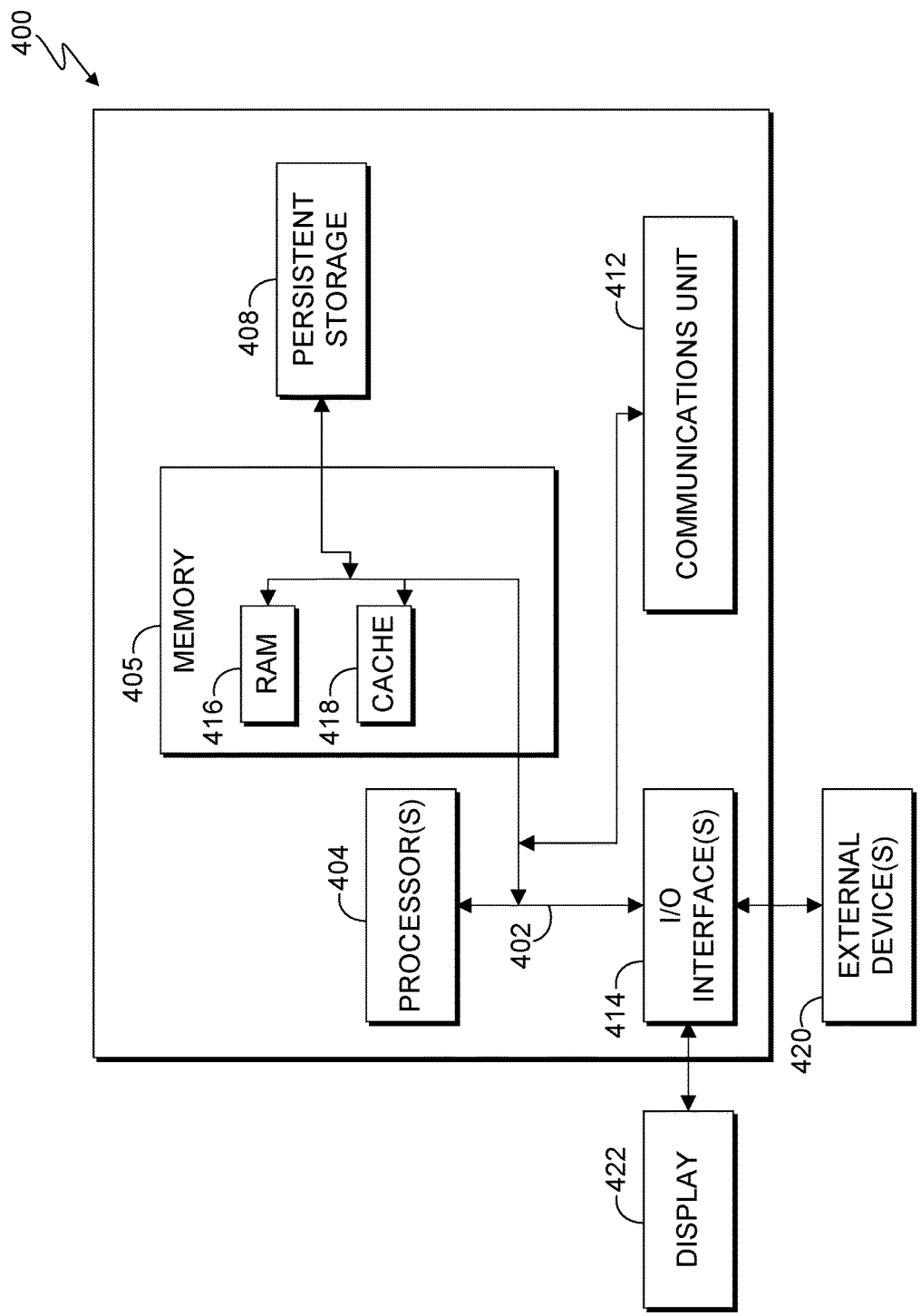
FIG. 4 is a block diagram of a computing apparatus 400 suitable for executing a community networking program, in accordance with at least one embodiment of the invention.

FIG. 4 is a block diagram depicting components of a computer 400 suitable for executing the community networking program 101. FIG. 4 displays the computer 400, the one or more processor(s) 404 (including one or more computer processors), the communications fabric 402, the memory 406, the RAM, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) and a cache 418. In general, the memory 406 may comprise any suitable volatile or non-volatile one or more computer readable storage media.

Program instructions for the community networking program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining that network connectivity does not exist for a mobile data network;
   initiating, via a wireless peer to peer communication protocol, a scan request to identify one or more peer devices, each of said one or more peer devices having a readiness score;
   generating a routing table, said routing table comprising said one or more peer devices located within a threshold distance;
   generating a forwarding table, said forwarding table comprising said one or more peer devices of said routing table having said readiness score that exceeds a given threshold; and
   transmitting a data packet to each of said one or more peer devices of said forwarding table.

2. The computer-implemented method of claim 1, further comprising at least one of:
   receiving said data packet; and
   generating said data packet.

3. The computer-implemented method of claim 1, further comprising sending, by at least one of said one or more peer devices, said data packet to a recipient system.

4. The computer-implemented method of claim 1, wherein at least one of said one or more peer devices is a static peer device.

5. The computer-implemented method of claim 1, wherein said readiness score identifies at least one of:
   a likelihood of each of said one or more peer devices to act as a transmitter of said data packet; and
   a readiness of each of said one or more peer devices to act as a transmitter of said data packet.

6. The computer-implemented method of claim 5, wherein each of said one or more peer devices:
   calculates said readiness score at a regular time interval; and
   broadcasts said readiness score at a regular time interval.

7. The computer-implemented method of claim 1, wherein said readiness score of each of said one or more peer devices is calculated based on at least one factor selected from the group consisting of:
   (a) an analytics score;
   (b) device resources;
   (c) available device data; and
   (d) a community participation score.

8. A computer program product, the computer program product comprising one or more computer readable storage media and program instructions stored on said one or more computer readable storage media, said program instructions comprising instructions to:
   determine that network connectivity does not exist for a mobile data network;
   initiate, via a wireless peer to peer communication protocol, a scan request to identify one or more peer devices, each of said one or more peer devices having a readiness score;
   generate a routing table, said routing table comprising said one or more peer devices located within a threshold distance;
   generate a forwarding table, said forwarding table comprising said one or more peer devices of said routing table having said readiness score that exceeds a given threshold; and
   transmit a data packet to each of said one or more peer devices of said forwarding table.

9. The computer program product of claim 8, further comprising at least one of:
   instructions to receive said data packet; and
   instructions to generate said data packet.

10. The computer program product of claim 8, further comprising instructions to send, by at least one of said one or more peer devices, said data packet to a recipient system.

11. The computer program product of claim 8, wherein at least one of said one or more peer devices is a static peer device.

12. The computer program product of claim 8, wherein said readiness score identifies at least one of:
   a likelihood of each of said one or more peer devices to act as a transmitter of said data packet; and
   a readiness of each of said one or more peer devices to act as a transmitter of said data packet.

13. The computer program product of claim 12, wherein each of said one or more peer devices:
   calculates said readiness score at a regular time interval; and
   broadcasts said readiness score at a regular time interval.

14. The computer program product of claim 8, wherein said readiness score of each of said one or more peer devices is calculated based on at least one factor selected from the group consisting of:
   (a) an analytics score;
   (b) device resources;
   (c) available device data; and
   (d) a community participation score.

15. A computer system, the computer system comprising:
   one or more computer processors;
   one or more computer readable storage media;
   computer program instructions for an origination device;
   said computer program instructions being stored on said one or more computer readable storage media;
   said computer program instructions comprising instructions comprising instructions for an origination device to:
      determine that network connectivity does not exist for a mobile data network;
      initiate, via a wireless peer to peer communication protocol, a scan request to identify one or more peer devices, each of said one or more peer devices having a readiness score;
      generate a routing table, said routing table comprising said one or more peer devices located within a threshold distance;
      generate a forwarding table, said forwarding table comprising said one or more peer devices of said routing table having said readiness score that exceeds a given threshold; and
      transmit a data packet to each of said one or more peer devices of said forwarding table.

16. The computer system of claim 15, further comprising at least one of:
   instructions to receive said data packet; and
   instructions to generate said data packet.

17. The computer system of claim 15, further comprising instructions to send, by at least one of said one or more peer devices, said data packet to a recipient system.

18. The computer system of claim 15, wherein at least one of said one or more peer devices is a static peer device.

19. The computer system of claim 15, wherein said readiness score identifies at least one of:
   a likelihood of each of said one or more peer devices to act as a transmitter of said data packet; and
   a readiness of each of said one or more peer devices to act as a transmitter of said data packet.

20. The computer system of claim 15, wherein said readiness score of each of said one or more peer devices is calculated based on at least one factor selected from the group consisting of:
   (a) an analytics score;
   (b) device resources;
   (c) available device data; and
   (d) a community participation score.

* * * * *